Patented Aug. 24, 1943

2,327,652

UNITED STATES PATENT OFFICE 2,327,652

PLASTIC COMPOSITION FOR LAMINATED GLASS INTERLAYERS

Lucas P. Kyrides, Webster Groves, Mo., assignor to Monsanto Chemical Company, St. Louis, Mo., a corporation of Delaware No Drawing. Application April 27, 1940, Serial No. 332,038

7 Claims. (Cl. 260—36)

The present invention relates to polymerized vinyl acetal plastic compositions of matter and particularly to such compositions which in the form of films are eminently suitable for use as resinous intermediate sheets or interlayers of laminated or safety glass.

This application is a continuation-in-part of my co-pending application, Serial No. 148,737, filed on June 17, 1937, which has issued as Patent No. 2,205,420, which in turn is a continuation-in-part of my prior applications, Serial Numbers 119,756 and 119,757, filed on January 7, 1937, which have issued as Patents Nos. 2,120,755 and 2,120,756, respectively, both of which are continuous-in-part of my prior applications, Serial No. 618,305, filed on June 20, 1932, which has issued as Patent No. 2,073,937, and Serial No. 648,986, filed on December 27, 1932, which has issued as Patent No. 2,073,938.

Cellulose esters have for a long time been used as the base of plastic compositions for intermediate sheets in safety glass manufacture. Nitrocellulose until a few years ago dominated the field for this purpose but because of its tendency to discoloration and decomposition on prolonged exposure to light it has lost its position to cellulose acetate. The imperfections of safety glass made from cellulose nitrate and cellulose actate are well recognized and, with the gradual development of other materials, the position of preeminence held by these cellulose esters is gradually being lost. Because of the tendency of cellulose acetate plastics to become brittle at low temperatures, they are being replaced by materials such as the condensation products of aldehydes with partially hydrolyzed vinyl ester polymers, known commonly and referred to herinafter as vinyl acetal polymers or vinyl actal resins or polyvinyl acetal resins, and designated in commerce under trade names such as "Formvar," "Butvar," "Alvar," certain "Vinylites," etc. Such polyvinyl acetal resins when plasticized with certain specific plasticizers or softeners yield films which are characterized by especially great elasticity, or by what is known as "nerve" in the rubber industry, which characteristic is especially desirable for resinous interlayers of safety glass.

It might be presumed that the technique which has gradually evolved and developed in the production of cellulose ester plastic sheets for use as interlayers in safety glass and the method of manufacturing safety glass therefrom could be applied without substantial modification to the production of plastic sheets of vinyl acetal resins and the manufacture of safety glass therefrom. However, these vinyl acetal resins present special difficulties of their own, not only in the compounding of plastic sheets, but also in incorporating the sheets between glass plates and in finishing the safety glass. For example, safety glass made with cellulose acetate sheets is usually sealed at the edges of the finished sheet, as is well known, but glass made with vinyl acetal resin sheets is not, because the methods which have been developed for sealing cellulose ester compositions are not directly applicable to sealing vinyl acetal resin compositions.

Of greatest importance in the production of plastic compositions for use in the manufacture of interlayers for safety glass are the modifying agents, particularly plasticizers, which are intimately incorporated into the basic plastic material. Most of the plasticizing materials which are in common use for modifying cellulose esters have been tried for modifying vinyl acetal resins. The results have been varied but in no case have they been satisfactory in all respects. Not only do the results indicate that the common known plasticizers are unsatisfactory for vinyl acetal resins, but they also indicate that there is no relationship between effectiveness in cellulose esters and effectiveness in vinyl acetal resins. It has thus become apparent that specific plasticizers for vinyl acetal resins are necessary if any degree of usefulness and effectiveness is to be obtained, especially when rubbery sheets of great flexibility at low temperatures are the desired result.

The common aryl phosphates, such as triphenyl phosphate and tricresyl phosphate, give films with vinyl acetal resins but these films are brittle at low temperature. Alkyl phthalates, such as dibutyl phthalate, when used as plasticizing agents for vinyl acetal resin films require the use of inordinately large proportions in the resulting composition and such films are soft. In attempting to achieve flexibility the addition of a large proportion of these plasticizers produces films in which flexibility is sacrificed for hardness or stiffness. Soft films of this character present certain difficulties in handling. Since soft films resist sliding movement over the glass sheets, they have a tendency to trap air between the surfaces of the layers and because of their tendency to deformation, they are not easily handled in washing. Some success has been attained by cooling such soft sheets before subjecting them to the operations necessary in safety glass manufacture but this and other makeshifts are resorted to only because no plasticizing material which imparts a desirable combination of properties to vinyl acetal resins is available.

The properties which are desirable in interlayers for safety glass are well known. Besides the properties of transparency, retentivity, resistance to discoloration by heat and actinic light, resistance and imperviousness to water, toughness, etc., there are other properties which have not been so well emphasized in the past, possibly because of the inability to realize heretofore any degree of improvement in these respects. These properties are rubberiness or elasticity, flexibility at low temperatures and relative hardness or stiffness of the film and freedom from tackiness so that it might the more easily be handled.

It is the object of the present invention to provide films characterized by and improved in the above-enumerated properties, which films have as their bases, vinyl acetal resins. It is a further object of the invention to provide a safety glass of improved characteristics.

In my co-pending application Serial No. 148,737, I disclosed that dialkyl esters of diglycolic and thiodiglycolic acids, for example, dibutyl diglycolate and dibutyl thiodiglycolate, impart to films or sheets of resinous polymers of vinyl acetals an inordinate degree of flexibility at low temperatures. In comparison with other plasticizing substances used with these materials, the diglycolates and thiodiglycolates are remarkable in at least two respects, viz., films plasticized with them can be subjected to low temperatures without great embrittlement and the plasticizer can be incorporated in proportions varying over a wide range without the production of substantial softness or tackiness in the resulting film. Furthermore, compositions plasticized with the specified substances are characterized by great transparency and toughness.

I have discovered that in place of the alkyl esters of diglycolic and thiodiglycolic acid specified in my prior applications I may use benzyl, tetrahydrofurfuryl or homologous esters of diglycolic and thiodiglycolic acids with certain attendant advantages.

The specified diglycolate and thiodiglycolate esters like most of the alkyl esters of my prior applications when pure are water-white high-boiling liquids which have a low rate of hydrolysis, are compatible with vinyl acetal resins and have exceptional retentivity therewith. These substances have a desirable combination of properties which make them eminently suitable for use in plastic compositions not only for intermediate sheets or interlayers in safety glass but also for purposes where such an extremely high standard of perfection in all directions is not demanded, for example, in sheets for wrapping and decoration, in molded products, and in coating compositions. Smaller proportions of these plasticizers can be used than is usually necessary with other materials to attain the same desired flexibility and such flexibility is not accompanied by undue softness.

The diglycolate and thiodiglycolate esters contemplated for use herein as plasticizers and modifying agents for vinyl acetal resin films and sheets are those resulting from esterification of the corresponding acids with alcohols such as benzyl alcohol, tetrahydrofurfuryl alcohol and their homologues. However, the esters may be made by methods other than by esterification of the acid by an alcohol. A suitable and preferred method of making the dibenzyl esters consists in reacting the sodium salt of the acid with benzyl chloride. Similarly, the corresponding acid, its chloride or anhydride may be reacted with tetrahydrofurfuryl alcohol to produce the ditetrahydrofurfuryl esters. The homologues, such as the tolyl diglycolates and thiodiglycolates, may be made by using the corresponding tolyl derivatives. In general, the compounds for use as plasticizers according to this invention correspond to the following general formula:

$$YOOC-CH_2-X-CH_2-COOY$$

in which X is an oxygen or sulfur atom and Y is a benzyl or tetrahydrofurfuryl radical or a homologue thereof.

The boiling points of the benzyl and tetrahydrofurfuryl esters of diglycolic and thiodiglycolic acids are in general higher than those of the lower alkyl derivatives of my prior application. The boiling points are shown in the following table:

*Boiling points, °C.*

Diglycolates:
| | |
|---|---|
| Diethyl | 168–180°/80°–100 mm. |
| Dibutyl | 131–133°/2–3 mm. |
| Dibenzyl | 215°/5 mm. |
| Dicyclohexyl | 325°/760 mm. |
| | 179°/2 mm. |

Thiodiglycolates:
| | |
|---|---|
| Di-n-butyl | 190°/5 mm. |
| | 205°/18 mm. |
| Diamyl | 159–175°/8 mm. |
| | 202°/18 mm. |
| Di-2-ethylbutyl | 228°/18 mm. |
| | 184–195°/2–3 mm. |
| Di-n-octyl | 360–365°/760 mm. |
| Di-2-ethylhexyl | 345–348°/760 mm. |
| Dibenzyl | 340–350°/760 mm. |
| Dicyclohexyl | 245–250°/30 mm. |
| | 182°–184°/3 mm. |
| Ditetrahydrofurfuryl | 203–205°/2 mm. |

The plasticizing substances are incorporated with the resins and polymers in varying amounts, ranging from small proportions up to equal parts by weight or even more, depending upon the properties desired in the final product. In general, the ratio of plasticizer to resin which is compatible and retained by the final composition varies slightly from one material to another but usually 50 parts of plasticizer to 100 parts of resin can be satisfactorily incorporated, and in many specific cases the limit of retentivity is even higher. The incorporation of the plasticizer with the resin can be effected by methods known to the art, for example, by the use of mutual solvents, or, as preferred, by kneading with the aid of heat. Substances other than the resins and plasticizers, for example, stabilizers, dyes, pigments, fillers and other plasticizers, may be incorporated into the composition. In general, the thiodiglycolate esters are less stable to heat and light than the corresponding diglycolate esters but the thiodiglycolates can be stabilized effectively.

Sheets prepared according to the invention can be used as interlayers in safety glass with or without adhesives. A preferred method of producting a sheet of safety glass consists in assembling the sheets of glass and interlayers and then pressing them to expel air between the sheets. They are then laminated under heat and pressure by means of a diaphragm press to which heat is applied. The pressing is finally completed by the hydraulic method, the resulting sheet being placed in an autoclave and exposed to a pressure of about 10 atmospheres and to a temperature from 100° to 150° C.

Specific preferred embodiments of the invention and advantages accruing therefrom are illustrated in the examples which follow.

*Example 1.*—Fifty parts of dibenzyl diglycolate are kneaded with 100 parts of a resin sold under the trade name "Butvar" which is a condensation product of butyraldehyde and a partially hydrolyzed vinyl ester resin.

The composition is warmed slightly to aid in the incorporation of the materials. The composition while still warm is placed between two plates in a press and formed into a film having a thickness of approximately 0.0325 inch.

The film is clear and stiff. When pulled between the fingers gently it shows excellent elongation with immediate recovery. There is no exudation of plasticizer from the film on standing.

*Example 2.*—Fifty parts of ditetrahydrofurfuryl thiodiglycolate are incorporated by the method of Example 1 with 100 parts of commercial resin sold under the trade name "Butvar," a condensation product of butyraldehyde with a partially hydrolyzed vinyl ester polymer. A film is made from the homogenized composition.

The resulting film is clear, tough and very flexible.

The following table illustrates typical comparative results obtained by subjecting films of approximately 0.02 to 0.0325 inch thickness plasticized according to this invention and similar films plasticized with alkyl diglycolates and thiodiglycolates of my prior applications and other materials to creasing or bending at a temperature of −20° F. (−29° C.). The number of bends, each bend consisting of a bend through an angle of 180° and back to the original position, which the composition withstands without cracking, are indicated. The films containing phthalates were soft whereas the diglycolate films were hard and firm, more or less like paper.

*Flexibility at −20° F.*

| Composition | Bends at −20° F. |
| --- | --- |
| Diethyl diglycolate 60 "Formvar" 100 | 99 |
| Dibutyl diglycolate 60 "Formvar" 100 | 60–101 |
| Dibutyl diglycolate 60 "Butvar" 100 | 80–135 |
| Dibutyl diglycolate 80 "Vinylite-X" 100 | Over 1500 |
| Dibenzyl diglycolate 50 "Butvar" 100 | 26 |
| Dicyclohexyl diglycolate 50 "Butvar" 100 | 19 |
| Dibutyl thiodiglycolate 50 "Butvar" 100 | 320 |
| Di-n-octyl thiodiglycolate 50 "Butvar" 100 | 560 |
| Di-2-ethylhexyl thiodiglycolate 50 "Butvar" 100 | 776 |
| Dibenzyl thiodiglycolate 50 "Butvar" 100 | 28–39 |
| Dicyclohexyl thiodiglycolate "Butvar" 100 | 52–82 |
| Ditetrahydrofurfuryl thiodiglycolate 50 "Butvar" 100 | 70 |
| *Comparison* | |
| Dimethyl phthalate 60 "Formvar" 100 | 33 |
| Diethyl phthalate 60 "Formvar" 100 | 50–74 |
| Dimethyl phthalate 75 "Formvar" 100 | 15–26 |

The plasticizers of the present invention when incorporated into polyvinyl acetal resin films are considerably less volatile from said films and therefore possess marked advantages in this respect over the alkyl diglycolate and thiodiglycolate ester plasticizers of my prior applications. The extent of these differences and comparisons in this respect with other recognized plasticizers for polyvinyl acetal resins are shown in the following table in which are listed the losses in weight after exposure to 105° C. in an oven for the indicated periods of films having a thickness of approximately 0.02 inch and which consisted of 100 parts of "Butvar" resin and 50 parts of the specified plasticizer.

*Volatility at 105° C. of plasticizer from "Butvar" sheets (50 parts to 100 parts resin)*

| | Percent loss after exposure for hours indicated | | | | |
| --- | --- | --- | --- | --- | --- |
| | 24 | 48 | 72 | 144 | 168 |
| Diglycolates: | | | | | |
| Dibutyl | 88.6 | 94.0 | 96.2 | 98.6 | 98.8 |
| Dibenzyl | 14.2 | 17.7 | 20.7 | 27.9 | 29.8 |
| Dicyclohexyl | 9.0 | 18.8 | 26.7 | 46.7 | 53.5 |
| Thiodiglycolates: | | | | | |
| Dibutyl | 73.0 | 82.5 | 91.0 | 95.6 | 97.0 |
| Di-n-octyl | 5.0 | 6.9 | 10.0 | | 23.0 |
| Di-2-ethyl-hexyl | 18.0 | 32.0 | 45.5 | | 77.5 |
| Dibenzyl | 5.9 | 7.2 | 9.2 | 13.9 | 15.5 |
| Dicyclohexyl | 5.0 | 10.0 | 15.5 | 30.3 | 34.7 |
| Ditetrahydrofurfuryl | 5.9 | 6.4 | 8.7 | | 14.2 |
| *Comparison* | | | | | |
| Dibutyl phthalate | 52 | 76 | 86 | | 94 |
| Dibutyl sebacate | 22 | 36 | 50 | | 83 |
| Triethylene glycol dihexoate | 18.5 | 33 | 47 | 76 | 82 |

In impact or shattering tests at low temperatures of sheets of safety glass made with interlayers of vinyl acetal resins containing the specified diglycolate and thiodiglycolate esters, the results indicate that the products have improved resistance to shattering. In conducting such tests metal balls of various weights and sheets of the glass, either 6 inches or 12 inches square, are used. The height from which a ball of a definite standard weight can be dropped without shattering the glass, which is maintained at a standard temperature, is determined. A sheet made with nitrocellulose at −10° F. (−23° C.) barely withstands the impact of a 0.5-pound ball dropped from a height of 3 feet whereas a glass made according to the invention withstands the impact of the same ball dropped from heights of 30 feet or more. A sheet of glass made with an interlayer of "Butvar" plasticized with dibenzyl diglycolate withstands an impact of a 2-pound ball dropped from height of over 15 feet.

Inasmuch as the foregoing description comprises preferred embodiments of the invention it is to be understood that the invention is not restricted thereto and that changes and modifications may be made without departing substantially from the invention, which is defined in the appended claims.

I claim:

1. A plastic composition comprising a vinyl acetal resin and embodying, as a modifying agent therefore, an ester selected from the group consisting of dibenzyl and ditetrahydrofurfuryl esters of thiodiglycolic acid and homologues thereof.

2. A plastic composition comprising a vinyl acetal resin and embodying, as a modifying agent therefor, dibenzyl thiodiglycolate.

3. A plastic composition comprising a vinyl acetal resin and embodying, as a modifying agent therefor, ditetrahydrofurfuryl thiodiglycolate.

4. A plastic composition comprising a resin resulting from the condensation of butyraldehyde with a partially hydrolyzed vinyl ester polymer and embodying, as a modifying agent therefor, an ester selected from the group consisting of dibenzyl and ditetrahydrofurfuryl esters of thiodiglycolic acid and homologues thereof.

5. A plastic interlayer film for safety glass formed of a resin resulting from the condensation of butyraldehyde with a partially hydrolyzed vinyl ester polymer, and embodying, as a modifier therefor, an ester selected from the group consisting of dibenzyl and ditetrahydrofurfuryl esters of thiodiglycolic acid and homologues thereof.

6. A plastic interlayer film for safety glass formed of a resin resulting from the condensation of butyraldehyde with a partially hydrolyzed vinyl ester polymer and embodying, as a modifier therefor, dibenzyl thiodiglycolate.

7. A plastic interlayer film for safety glass formed of a resin resulting from the condensation of butyraldehyde with a partially hydrolyzed vinyl ester polymer and embodying, as a modifier therefor, ditetrahydrofurfuryl thiodiglycolate.

LUCAS P. KYRIDES.